United States Patent [19]
Prudhon

[11] 3,758,081
[45] Sept. 11, 1973

[54] QUENCH CHAMBER FOR HOT GASES

[75] Inventor: Francois Prudhon, Saint-Auban, France

[73] Assignee: Rhone-Progil, Courbevoie, France

[22] Filed: Mar. 31, 1971

[21] Appl. No.: 129,841

[30] Foreign Application Priority Data
Apr. 2, 1970 France .............................. 7011873

[52] U.S. Cl. .............. 261/18 B, 23/252 A, 261/188, 261/DIG. 54
[51] Int. Cl. ............................................... B01f 3/04
[58] Field of Search ................. 261/18 B, 115, 118, 261/DIG. 54, 116, 117; 55/94, 220; 266/32; 202/185 A; 203/86; 196/140; 23/252 A

[56] References Cited
UNITED STATES PATENTS

| | | | |
|---|---|---|---|
| 2,910,248 | 10/1959 | Kueter et al. | 261/18 B |
| | | Pedrick | 261/18 B |
| 2,916,268 | 12/1959 | Pedrick | 261/18 B |
| 3,353,335 | 11/1967 | Caballero | 261/18 B |
| 3,360,248 | 12/1967 | Lindeman et al. | 261/117 |
| 3,520,524 | 7/1970 | Stawarz et al. | 203/86 |
| 3,521,874 | 7/1970 | Warfield et al. | 203/86 |
| 3,524,630 | 8/1970 | Marion | 261/DIG. 54 |

OTHER PUBLICATIONS
Oliver, The Corrosion Forum, Chem. Engr. 9-52, pp. 276 and 278.

Primary Examiner—Tim R. Miles
Assistant Examiner—William Cuchlinski, Jr.
Attorney—McDougall, Hersh & Scott

[57] ABSTRACT

A quench chamber for hot gases comprising an internal jacket formed of porous graphite and defining an internal volume, an external jacket encasing the internal jacket and defining at least one compartment therebetween and passage means communicating with the compartment and the internal volume for the passage of a cooling fluid to the internal volume.

4 Claims, 1 Drawing Figure

PATENTED SEP 11 1973 3,758,081
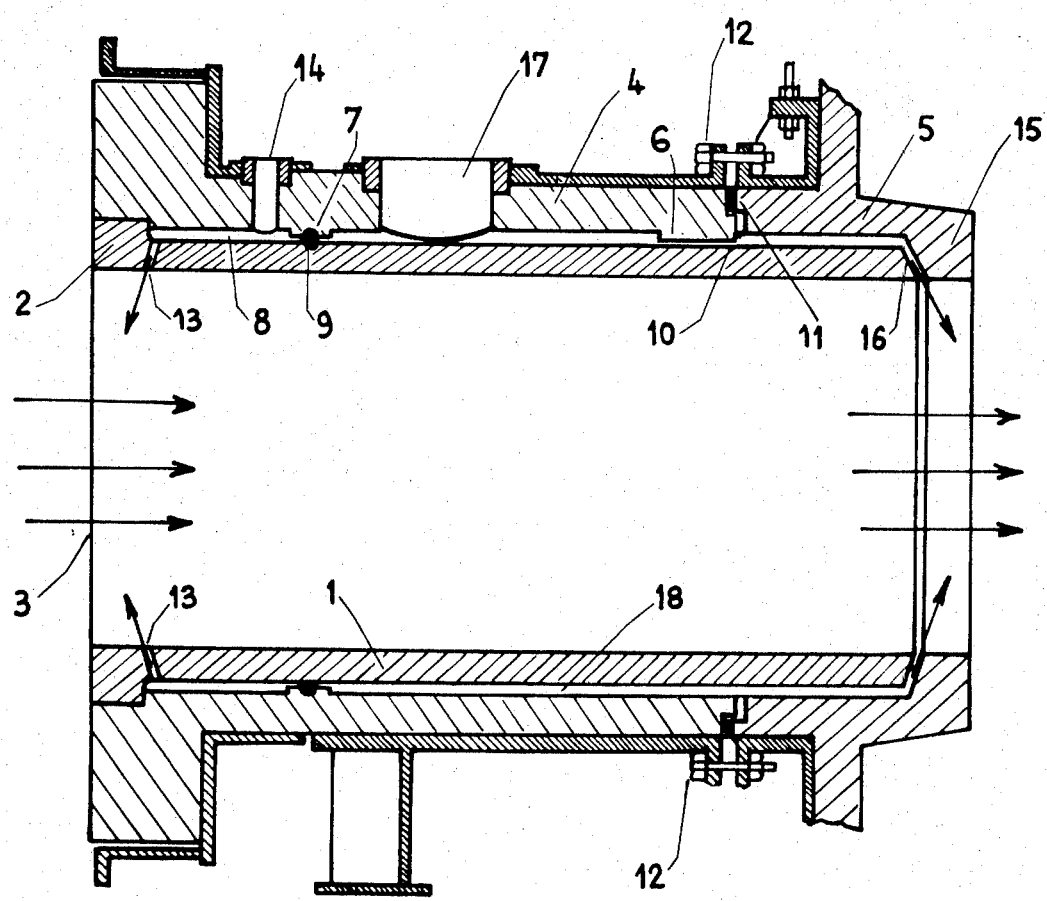

QUENCH CHAMBER FOR HOT GASES

The present invention relates to quench chambers for hot gases, and more particularly to quench chambers having inner walls formed of graphite for use with corrosive hot gases.

It is well-known that in some industrial operations involving violent exothermic reactions, with the frequent occurrence of flames, it is generally advisable to rapidly reduce the temperature of resulting gases for the purpose of, for instance, enabling the condensation of the condensable portions to facilitate recovery of such condensable gases.

These gases may contain varying fractions of very corrosive compounds, which prevent the use of common materials of construction for processing equipment since such materials of construction are rapidly destroyed by corrosive components of the reaction gases. In addition, the products produced as a result of corrosion of such materials also serve to contaminate the condensable components of the reaction gases sought to be recovered. This is the case where, for example, the reaction gases are the products of the combustion of certain wastes from the preparation of halogenated hydrocarbons, and consequently contain such halogenated hydrocarbons and significant amounts of the corresponding hydrogen halide. Heretofore, the recovery of such halogenated hydrocarbons by condensation has posed a serious problem because of the very corrosive effects of hydrogen halides.

It is accordingly an object of the present invention to provide an improved quench chamber for the quenching with liquid medium of hot gases containing highly corrosive components in which the quench chamber is formed with an interior wall of graphite.

This and other objects and advantages of the invention will more fully appear hereinafter, and, for purposes of illustration and not of limitation, an embodiment of the invention is shown in the accompanying drawing in which the FIGURE is a sectional view of a quench chamber embodying the features of this invention.

The concepts of the present invention reside in a chamber for quenching hot gases, and particularly hot gases containing corrosive components, in the form of double jacketed chamber which is practically immune to attack from corrosive gases. The quench chamber of this invention includes an internal jacket formed of porous graphite which, by provision of a space about the interior jacket, is encased by an external jacket which can be formed of a variety of materials. The space between the interior and exterior jackets may be in the form of a single compartment or of a plurality of compartments formed by partitions or other suitable dividing walls. The compartment or compartments are adapted to be fed with one or more cooling or quench liquids, and communicate through orifices with the interior volume defined by the internal jacket for passage of the quench liquid or liquids under suitable pressure to the volume defined by the interior jacket.

It is well-known that graphite has effective corrosion resistance. However, it has been found that, in spite of the high thermal conductivity of graphite, graphite cannot withstand the high temperature differences between the hot gases in the chamber and the cooling liquid in the space between the internal and external jackets unless the graphite forming the internal jacket is porous. Without limiting the present invention as to theory, it is believed that the ability of porous graphite to withstand such temperature differences is due to the evaporation of the cooling liquid from the pores of the graphite on contact with the hot gases as a result of passage of a portion of the cooling liquid through pores of the graphite interior jacket whereby the graphite interior jacket is maintained at a lower temperature. It has been found that if use is made of an interior jacket formed of non-porous graphite, such as graphite prepared by impregnation with the use of various resins or other heat-hardenable fluid materials, scalings build up on the walls of the interior jacket and adversely affect the useful life of the apparatus.

It will be understood by those skilled in the art that the material forming the external jacket of the chamber can be selected from a variety of materials, depending on the cooling liquids to be admitted in the spacing between the jackets. When the cooling liquids are sparingly corrosive in their own right, the common metals such as steel may be sufficient. In other cases where the cooling or quench liquids are corrosive, such as, for instance, diluted acids, the external jacket can be formed of various stainless alloys, titanium and even in some cases of non-porous graphite, such as graphite prepared by impregnation.

By way of illustration of the present invention, there is described hereinafter a chamber particularly well suited for the rapid cooling, by means of water and diluted hydrochloric acid, of the gases originating from the destruction by combustion of wastes resulting from the production of chlorinated hydrocarbons. The chamber is preferably formed of an impregnated graphite external jacket with the space between the jackets being divided into two compartments, one of which is fed with water and the other of which is supplied with the diluted acid.

Referring now to the drawing, the internal jacket 1 of the chamber is formed of a porous graphite tube having a shoulder 2 with the intake of hot gases being made at the end 3 of this jacket.

The external jacket, which is separated from the internal jacket by a space, is composed of two elements, a front element 4 and a back element 5. The front element 4 is on one side fitted on the shoulder 2 and on the other side centered on the internal jacket by three internal bosses 6 located at 120°. The front element 4 is also equipped with an internal crown 7 which delimits a front compartment 8, the tightness being ensured by the toric joint 9. The back element 5 is centered on the front element 4 by means of the fitting 10 and applied on it with an intermediate joint 11 by means of a series of bolts located in crown-form of which two are represented by 12 and fixing together metal flanges integral with the elements 4 and 5. In the element 1 there is provided a series of holes 13 for passage of a first cooling liquid into the chamber with this liquid being admitted in the compartment 8 by the pipe branch 14. The back element 5 is equipped with a crown 15 at its back end, which is separated from the back end of the internal jacket 1 by an annular spacing 16 for passage of a second cooling liquid into the chamber, this liquid arriving through the pipe branch 17 into the second compartment 18 of the space between both jackets.

By way of illustration of operation, a gas cooling chamber whose inside diameter is 0.7 m and length is 2.4 m can process hourly about 5 tons of gas at 1200° originated from destruction by combustion of production wastes of chlorinated hydrocarbons by means of 1 t/h of water admitted by the holes 13 in the chamber and which is entirely vaporized and by 100 t/h passing through the annular spacing 16 of a recycled solution of a 20 percent by weight hydrochloric acid at 50°C, which can be derived from the condensation of the hydrochloric acid contained in the gas to be treated. On the circuit of this 20 percent hydrochloric acid solution, there is drawn off the part corresponding to the amount of solution obtained by condensation of the gases in the chamber, this part being able to be used without any modification, or distillation, or concentration. The acid non-condensed fraction of gases issuing from the outlet can be treated by washing with water and with diluted soda before disposal.

It will be apparant that various changes and modification can be made in the details of construction and use without departing from the spirit of the invention, especially as defined in the following claims.

I claim:

1. A quench chamber for hot gases comprising an internal jacket formed of porous graphite and defining an internal volume and an inlet and outlet communicating with the internal volume, an external jacket encasing the internal jacket and defining two compartments between the internal and external jackets, first passage means in the internal jacket adjacent to said inlet communicating with one compartment and with the internal volume, first means to supply a cooling fluid to said one compartment for passage through said first passage means to the internal volume, with the means to supply a cooling fluid to said one compartment being longitudinally spaced from the first passage means, second passage means in the internal jacket adjacent said outlet communicating with the other compartment and with the internal volume, and second means to supply a cooling fluid to said other compartment for passage through said second passage means to the internal volume.

2. A chamber as defined in Claim 1 wherein the external jacket is formed of a metal.

3. A chamber as defined in Claim 1 wherein the external jacket is formed of non-porous graphite.

4. A chamber as defined in claim 1 wherein the first means to supply a cooling fluid is positioned downstream from said first passage means and the second means to supply a cooling fluid is positioned upstream from said second passage means.

* * * * *